(12) United States Patent
Kim et al.

(10) Patent No.: US 11,701,937 B2
(45) Date of Patent: Jul. 18, 2023

(54) SUSPENSION APPARATUS FOR VEHICLE

(71) Applicant: HYUNDAI MOBIS Co., Ltd., Seoul (KR)

(72) Inventors: Young Ha Kim, Yongin-si (KR); Jong Sung Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/724,981

(22) Filed: Apr. 20, 2022

(65) Prior Publication Data
US 2022/0363101 A1  Nov. 17, 2022

(30) Foreign Application Priority Data

May 12, 2021  (KR) ........................ 10-2021-0061659

(51) Int. Cl.
  *B60G 11/20*  (2006.01)
(52) U.S. Cl.
  CPC .................................... *B60G 11/20* (2013.01)
(58) Field of Classification Search
  CPC ......... B60G 11/20; B60G 11/22; B60G 11/08; B60G 11/10; B60G 5/065; B60G 3/28; B60G 11/42; B60G 21/05; B60G 2204/125; B60G 2202/114
  See application file for complete search history.

(56) References Cited

U.S. PATENT DOCUMENTS

| | | | | |
|---|---|---|---|---|
| 4,768,807 A | * | 9/1988 | McGibbon | F16F 1/3686 267/269 |
| 2019/0241036 A1 | * | 8/2019 | Winter | B60G 7/02 |
| 2021/0129613 A1 | * | 5/2021 | Tanquary | B60G 11/22 |
| 2021/0379948 A1 | * | 12/2021 | Rosenmeyer | B60G 11/08 |

FOREIGN PATENT DOCUMENTS

| | | | | |
|---|---|---|---|---|
| CN | 107225927 A | * | 10/2017 | B60G 11/06 |
| CN | 107499081 A | * | 12/2017 | |
| CN | 217415402 U | * | 9/2022 | |
| FR | 2991917 A1 | * | 12/2013 | B60G 11/08 |
| KR | 10-0422691 B1 | | 3/2004 | |

\* cited by examiner

*Primary Examiner* — Paul N Dickson
*Assistant Examiner* — Matthew D Lee
(74) *Attorney, Agent, or Firm* — Morgan, Lewis & Bockius LLP

(57) ABSTRACT

A suspension apparatus for a vehicle may include: a member part including a side member part extended in a first direction and a cross member part extended in a second direction; a pair of knuckle parts spaced apart from each other in the second direction, and coupled to and supported by a wheel; and a posture maintenance part supported by the member part, having both sides connected to the pair of knuckle parts, respectively, and configured to absorb shock applied from a road surface and adjust a relative height between the pair of knuckle parts.

14 Claims, 7 Drawing Sheets

SUSPENSION APPARATUS FOR VEHICLE

CROSS-REFERENCE TO RELATED APPLICATION

This application claims priority from and the benefit of Korean Patent Application No. 10-2021-0061659, filed on May 12, 2021, which is hereby incorporated by reference for all purposes as if set forth herein.

BACKGROUND

Field

Exemplary embodiments of the present disclosure relate to a suspension apparatus for a vehicle, and more particularly, to a multi-link suspension apparatus for a vehicle.

Discussion of the Background

In general, a suspension of a vehicle is an apparatus for improving ride comfort and driving stability, and performs a function of suppressing or rapidly reducing vibration applied from a wheel, while stably supporting a vehicle body from the wheel.

Such a suspension may be classified into a MacPherson strut suspension, a double wishbone suspension, and a multi-link suspension, according to the structure thereof. The multi-link suspension is an independent-type suspension which is designed to use three to five independent links, such that a wheel is vertically placed on the road surface. The multi-link suspension may allow the links to be freely arranged and precisely designed. The multi-link suspension can easily deal with a change in alignment which occurs when the suspension is vertically moved while driving forces are applied to front/rear and left/right wheels, thereby securing steering stability.

In the conventional multi-link suspension, however, a function of connecting the wheel and the vehicle body, a function of supporting a load of the vehicle, and a function of preventing a roll of the vehicle are individually performed by arms, a coil spring, a stabilizer bar and the like. Thus, the weight of the vehicle is increased, and the number of operations is increased during an assembly process. Furthermore, since the coil spring is extended in the height direction of the vehicle, the coil spring may occupy an excessive volume.

The related art of the present disclosure is disclosed in Korean Patent No. 10-0422691 registered on Mar. 2, 2004 and entitled "Stabilizer Link for Vehicle."

SUMMARY

Various embodiments are directed to a suspension apparatus for a vehicle, which can perform various functions with a simple structure at the same time, the various functions including a function of connecting a wheel and a vehicle body, a function of supporting a load of a vehicle, and a function of preventing a roll of the vehicle.

In an embodiment, a suspension apparatus for a vehicle may include: a member part including a side member part extended in a first direction and a cross member part extended in a second direction; a pair of knuckle parts spaced apart from each other in the widthwise direction of the vehicle, and coupled to and supported by a wheel; and a posture maintenance part supported by the member part, having both sides connected to the pair of knuckle parts, respectively, and configured to absorb shock and adjust a relative height between the pair of knuckle parts.

The posture maintenance part may include: a support part rotatably coupled to the member part; a pair of elastic parts fixed to both sides of the support part, each elastic part having one side connected to the corresponding knuckle part, and configured to offset a change in height of the knuckle part with an elastic restoring force thereof; and a fixed part fixed at a position facing the other side of the elastic part, and configured to come into contact with or separate from the other side of the elastic part according to a rotation direction of the support part.

The support part may include: a body facing the member part; a joint disposed in a center of the body, and configured to rotatably support the body with respect to the member part; and a bush disposed on either side of the body, and connected to the member part so as to restrict the rotation angle of the body.

The joint may have a one side connected to a surface of the body, and the other side rotatably connected to an inner surface of the cross member part.

The bush may be made of an elastic material.

The pair of elastic parts may apply elastic restoring forces, acting in the opposite directions, to the pair of knuckle parts, when the support part is rotated.

The elastic part may include: a fastening part fixed to the support part, and having a first seating part and a second seating part; a first elastic member having one side seated on the first seating part and the other side connected to the knuckle part; and a second elastic member having one side seated on the second seating part and the other side selectively contacted with the fixed part.

The first seating part and the second seating part may be provided with a groove recessed into the fastening part.

The first seating part and the second seating part may be recessed into the fastening part such that open sides thereof face different directions.

An end of the first elastic member may be disposed in the first seating part, and fixed to the fastening part by a bolt.

An end of the second elastic member may be disposed in the second seating part, and fixed to the fastening part by a bolt.

The first elastic member and the second elastic member may be made of GFRP (Glass Fiber Reinforced Plastic).

The first elastic member and the second elastic member may be extended so as to be curved at a predetermined curvature.

The fixed part may be fixed to the member part.

The first direction may be a longitudinal direction of the vehicle, and the second direction may be a widthwise direction of the vehicle.

In accordance with the embodiment of the present disclosure, the suspension apparatus for a vehicle may perform various functions with a single structure of the posture maintenance part at the same time, the various functions including a function of connecting a wheel and a vehicle body, a function of supporting a load of the vehicle, and a function of preventing a roll of the vehicle. Thus, the suspension apparatus can simplify the assembly process, and reduce the entire weight of the suspension parts, compared to when a lower arm, a coil spring, and a stabilizer are separately installed.

Furthermore, in the suspension apparatus for a vehicle, the elastic part for supporting the weight of the vehicle may be extended in the widthwise direction of the vehicle such that the volume thereof decreases in the height direction of the vehicle, which makes it possible to secure a wider interior space of the vehicle. Therefore, the suspension apparatus can be applied to a future vehicle system such as PBV.

DETAILED DESCRIPTION OF THE ILLUSTRATED EMBODIMENTS

Figure 1:
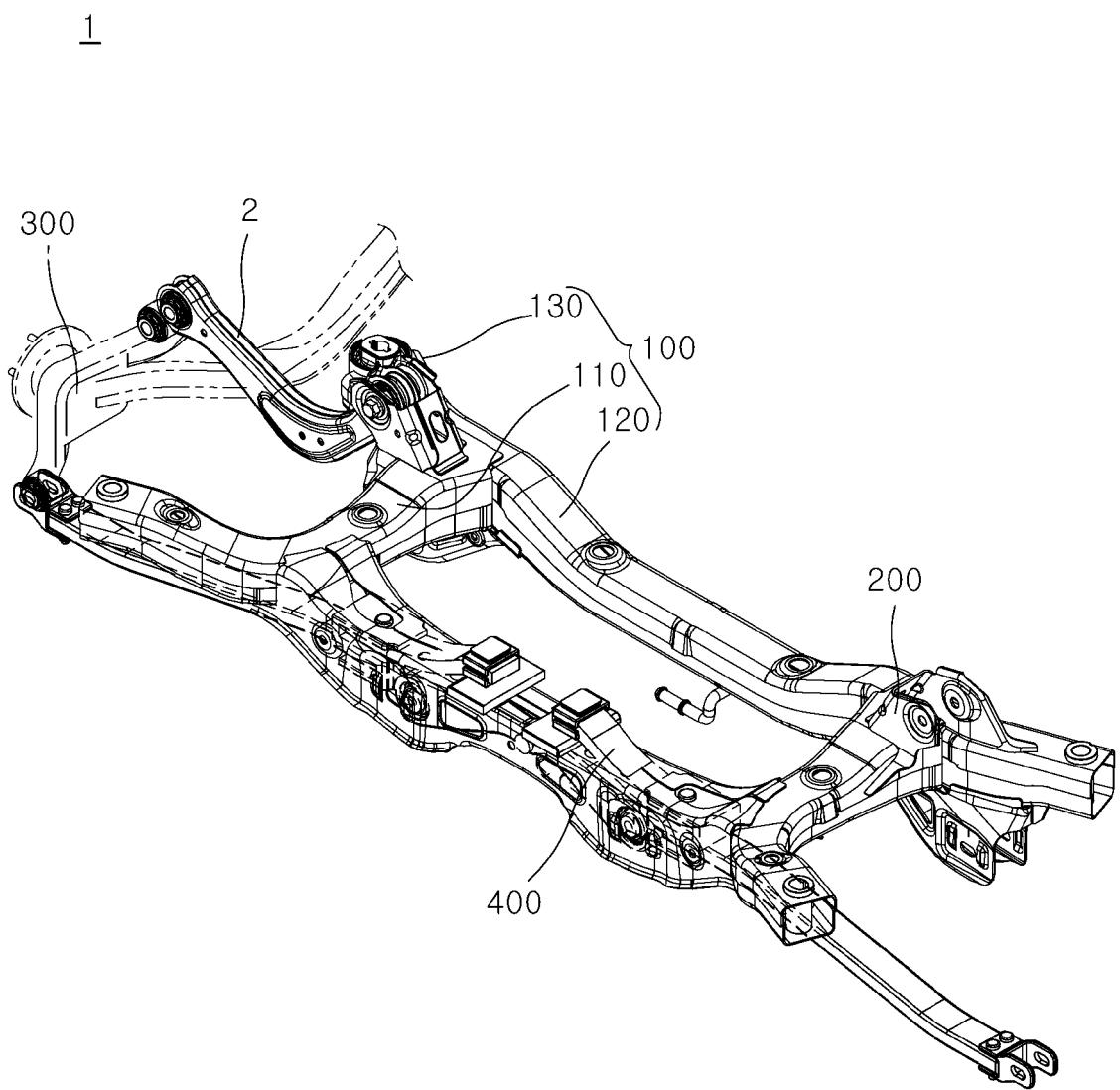
FIG. 1 is a perspective view schematically illustrating the configuration of a suspension apparatus for a vehicle in accordance with an embodiment of the present disclosure.

Hereinafter, a suspension apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Throughout the specification, when one element is referred to as being "connected to" or "coupled to" another element, it may indicate that the one element is "directly connected or coupled to" the another element or the one element is "indirectly connected or coupled to" with still another element interposed therebetween. In this specification, when an element "includes or has" a component, it may indicate that the element does not exclude another component unless referred to the contrary, but can further include or have another component.

Throughout the specification, like reference numerals may represent the same components. Although like or similar reference numbers are not mentioned or described in a specific drawing, the reference numerals may be described on the basis of other drawings. Furthermore, although a component is not represented by a reference numeral in a specific drawing, the component may be described on the basis of other drawings. Furthermore, the number, shape and size of sub components included in the drawings of this application and the relative difference between sizes are set for convenience of description, and may not limit embodiments but may be implemented into various forms.

Figure 2:
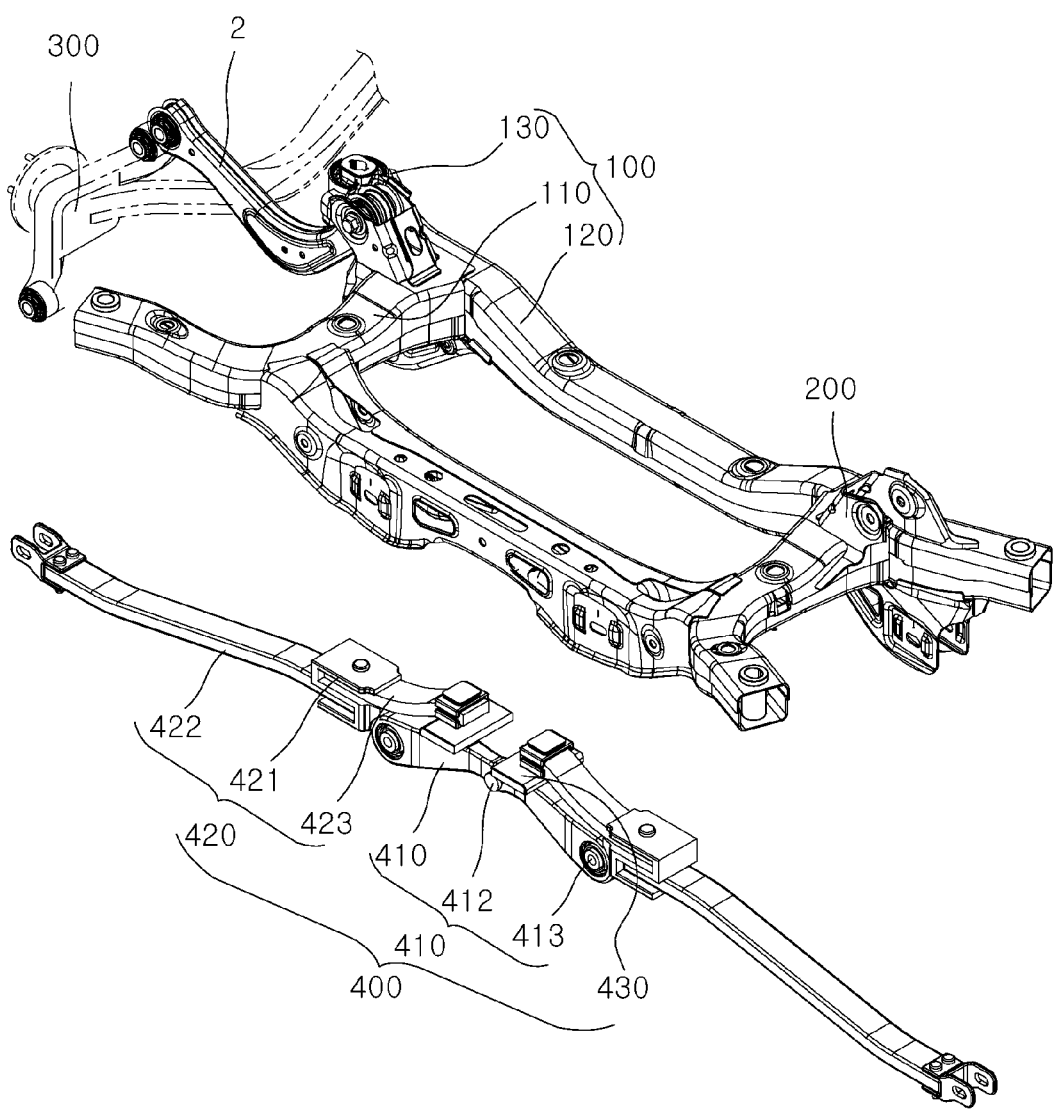
FIG. 2 is an exploded perspective view schematically illustrating the configuration of the suspension apparatus for a vehicle in accordance with the embodiment of the present disclosure.

FIG. 1 is a perspective view schematically illustrating the configuration of a suspension apparatus for a vehicle in accordance with an embodiment of the present disclosure, and FIG. 2 is an exploded perspective view schematically illustrating the configuration of the suspension apparatus for a vehicle in accordance with the embodiment of the present disclosure.

Referring to FIGS. 1 and 2, a suspension apparatus 1 for a vehicle in accordance with an embodiment of the present disclosure includes a member part 100, a bracket part 200, a knuckle part 300, and a posture maintenance part 400.

The member part 100 is installed on a rear bottom surface of a vehicle, and serves to reinforce the hardness of a vehicle body. The member part 100 may be made of a material having high hardness, such as steel or aluminum, and thus sufficiently endure a load and vibration applied from a suspension and a driving system.

The member part 100 in accordance with the embodiment of the present disclosure includes a side member part 110, a cross member part 120, and a mounting part 130.

The side member part 110 is extended in a longitudinal direction thereof, corresponding to a front-to-rear direction parallel to the longitudinal direction of the vehicle, and serves to reinforce the hardness of the vehicle body in the longitudinal direction of the vehicle. The side member part 110 is provided as a pair of side member parts which are spaced apart by a predetermined distance from each other in a widthwise direction of the vehicle. The specific shape of the side member part 110 is not limited to that illustrated in FIGS. 1 and 2, but may be varied in design as long as the side member part 110 can reinforce the hardness of the vehicle body in the longitudinal direction of the vehicle.

The cross member part 120 is extended in a longitudinal direction thereof, corresponding to a side-to-side direction parallel to the widthwise direction of the vehicle, and serves to reinforce the hardness of the vehicle body in the widthwise direction of the vehicle. The cross member part 120 is disposed between the pair of side member parts 110 which are spaced apart from each other while facing each other. The cross member part 120 is provided as a pair of cross member parts which are spaced apart by a predetermined distance from each other in the longitudinal direction of the vehicle. The pair of cross member parts 120 may each have both ends coupled to the pair of side member parts 110, respectively, through welding or bolting. The specific shape of the cross member part 120 is not limited to that illustrated in FIGS. 1 and 2, but may be varied in design as long as the cross member part 120 can reinforce the hardness of the vehicle body in the widthwise direction of the vehicle.

The mounting part 130 is connected to the vehicle body, and serves to fix the side member part 110 and the cross member part 120 to the bottom of the vehicle body. The mounting part 130 may be provided as a plurality of mounting parts which are disposed at both ends of the side member part 110, respectively. The specific shape of the mounting part 130 is not limited to that illustrated in FIGS. 1 and 2, but may be varied in design as long as the mounting part 130 can be connected to the vehicle body and support the side member part 110 and the cross member part 120.

The bracket part 200 is fixed to the member part 100, and one side of a suspension arm 2 is mounted inside the bracket part 200. The suspension arm 2 serves to connect a wheel to the vehicle body, and may be exemplified as a link arm which is generally applied to a multi-link suspension. The bracket part 200 in accordance with the embodiment of the present disclosure is coupled to the outer surface of the side member part 110 or the cross member part 120 through welding or bolting. The bracket part 200 is formed in a hollow shape such that one end of the suspension arm 2 can be inserted into the bracket part 200. The bracket part 200 has at least one open surface through which the suspension arm 2 can enter the bracket part 200. One end of the suspension arm 2 is rotatably connected to the bracket part 200 through a bush or the like. The number and installation positions of the bracket parts 200 may be varied in design depending on the number and arrangement of the suspension arms 2.

The knuckle part 300 is coupled to the wheel (not illustrated) and supported by the wheel, and provides a space in which the suspension arm 2 is connected to the posture maintenance part 400 which will be described below. The knuckle part 300 is provided as a pair of knuckle parts which are spaced apart from each other in the widthwise direction of the vehicle, and individually coupled to both wheels. The knuckle part 300 in accordance with the embodiment of the present disclosure has one side coupled to the inside of the wheel through a wheel bearing (not illustrated) which rotatably supports the wheel, and is supported by the wheel. The other side of the knuckle part 300 faces the side member part 110. The other side of the knuckle part 300 is formed so that the other end of the suspension arm 2 is connectable to the posture maintenance part 400. The specific shape of the knuckle part 300 is not limited to that illustrated in FIGS. 1 and 2, but may be varied in design depending on the numbers and arrangement of the suspension arms 2 and the posture maintenance part 400.

The posture maintenance part 400 is supported by the member part 100, and has both sides connected to the pair of knuckle parts 300, respectively, so as to connect the wheel to the member part 100. The posture maintenance part 400 has an elastic restoring force. The posture maintenance part 400 supports the load of the vehicle with the elastic restoration force, and absorbs shock or vibration applied to the member part 100 or the vehicle body from the road surface when the vehicle travels. Furthermore, when a height difference occurs between both wheels due to an uneven road surface or a load strain caused by lateral acceleration while the vehicle makes a turn, the posture maintenance part 400 adjusts the relative height between the pair of knuckle parts 300 by applying an elastic restoring force in a direction to offset the height difference between both wheels, thereby preventing a roll of the vehicle. That is, the posture maintenance part 400 serves to perform overall functions which have been separately performed by a lower arm, a coil spring, and a stabilizer, which are installed in an existing suspension for a vehicle. Thus, the posture maintenance part 400 can simplify the assembly process, and reduce the entire weight of the suspension parts, compared to when the lower arm, the coil spring, and the stabilizer are separately installed.

Figure 3:
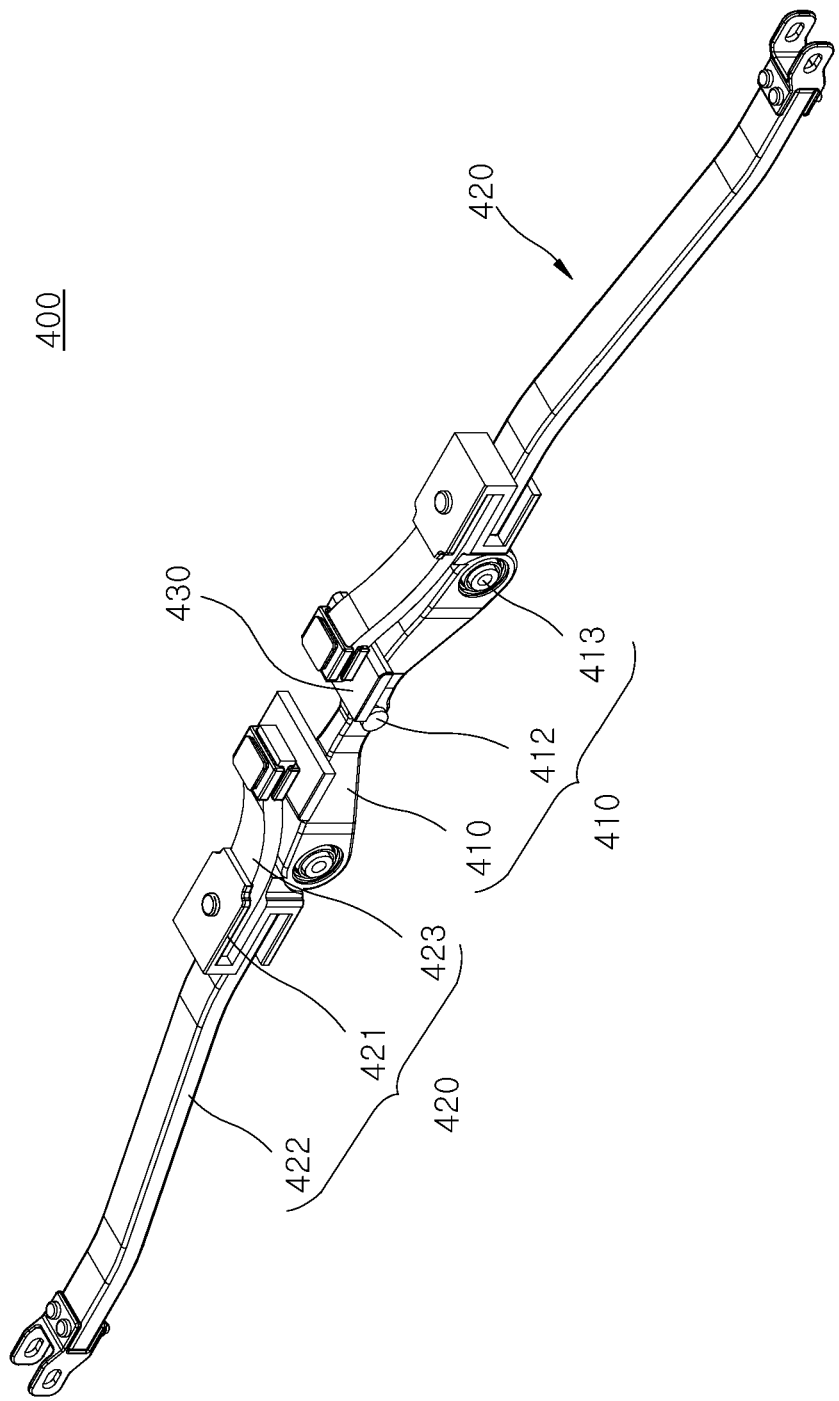
FIG. 3 is a perspective view schematically illustrating the configuration of a posture maintenance part in accordance with an embodiment of the present disclosure.
Figure 4:
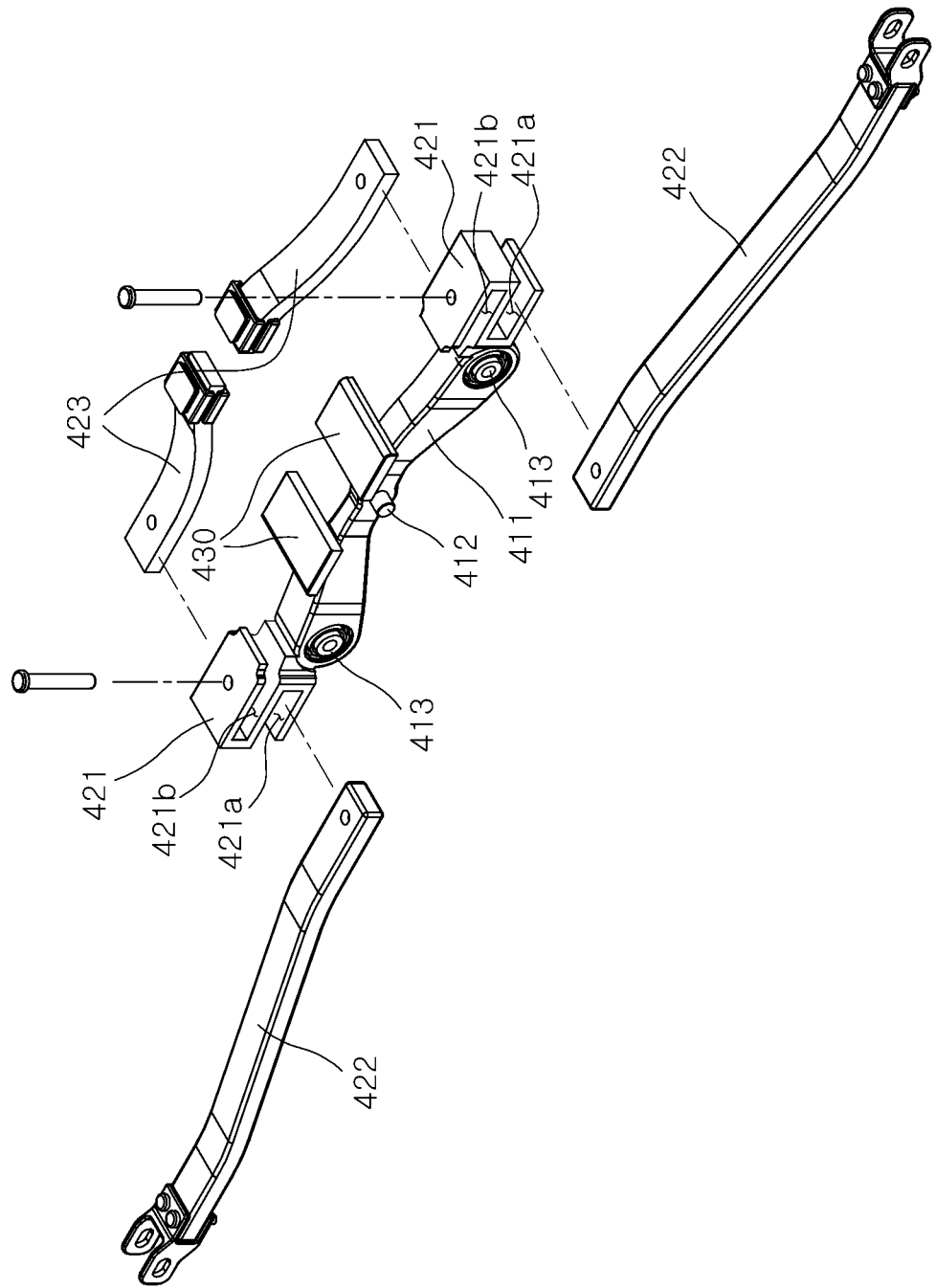
FIG. 4 is an exploded perspective view schematically illustrating the configuration of the posture maintenance part in accordance with the embodiment of the present disclosure.
Figure 5:
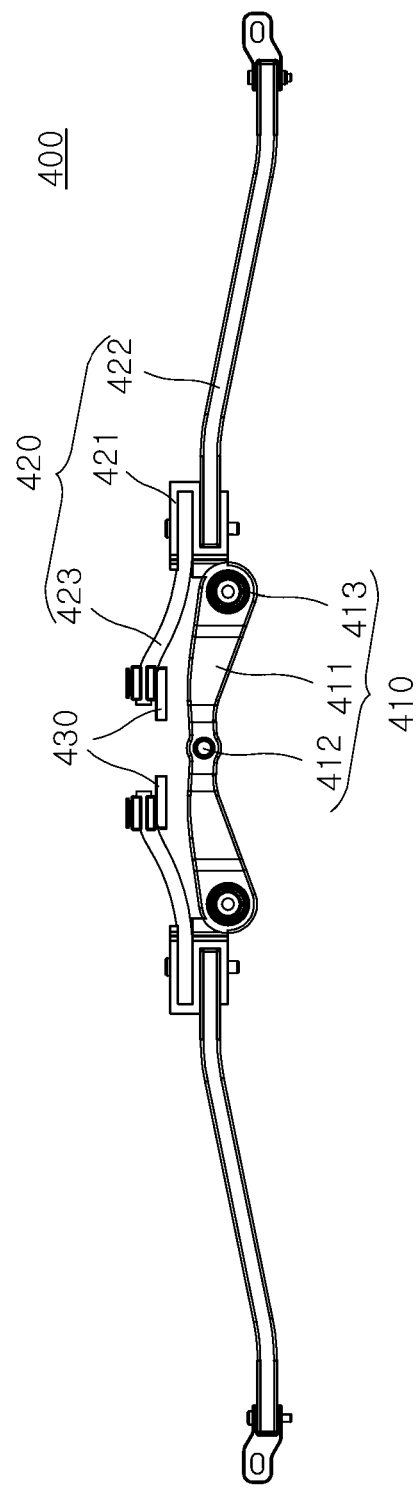
FIG. 5 is a front view schematically illustrating the configuration of the posture maintenance part in accordance with the embodiment of the present disclosure.

FIG. 3 is a perspective view schematically illustrating the configuration of the posture maintenance part in accordance with an embodiment of the present disclosure, FIG. 4 is an exploded perspective view schematically illustrating the configuration of the posture maintenance part in accordance with the embodiment of the present disclosure, and FIG. 5 is a front view schematically illustrating the configuration of the posture maintenance part in accordance with the embodiment of the present disclosure.

Referring to FIGS. 1 to 5, the posture maintenance part 400 in accordance with the embodiment of the present disclosure includes a support part 410, an elastic part 420, and a fixed part 430.

The support part 410 is rotatably coupled to the member part 100, and supports the elastic part 420 which will be described below. The support part 410 in accordance with the embodiment of the present disclosure includes a body 411, a joint 412, and a bush 413.

The body 411 forms the schematic exterior of the support part 410 in accordance with the embodiment of the present disclosure, and is disposed so as to face the member part 100. The body 411 in accordance with the embodiment of the present disclosure has one surface facing the inner surface of the cross member part 120. The body 411 is disposed so that the central portion thereof coincides with the central line of the vehicle in the widthwise direction thereof or the central line of the cross member part 120. The body 411 has both sides extended in a direction parallel to the widthwise direction of the vehicle on the basis of the central portion thereof. The specific shape of the body 411 is not limited to that illustrated in FIG. 3, but may be varied in design as long as the body 411 can support the elastic part 420 while facing the member part 100.

The joint 412 is disposed in the center of the body 411, and rotatably supports the body 411 with respect to the member part. The joint 412 in accordance with the embodiment of the present disclosure may be formed in the shape of a rotating shaft that vertically protrudes toward the inner surface of the cross member part 120 from one surface of the body 411. The joint 412 has one side connected to one surface of the body 411 through welding or the like and the other side rotatably connected to the inner surface of the cross member part 120. Thus, when both wheels are out-of-phase, the joint 412 may function as a central shaft that supports the rotation of the posture maintenance part 400 as a whole.

The bush 413 is connected to the member part 100, and serves to limit the rotation angle of the body 411. The bush 413 is provided as a pair of bushes which are disposed on both sides of the body 411, respectively. The bush 413 in accordance with the embodiment of the present disclosure may be exemplified as a cylindrical mounting bush made of an elastic material such as rubber or silicone. The pair of bushes 413 are disposed on both sides of the body 411, and connected to the inner surface of the cross member part 120. When a rotational force is applied to the body 411 because both wheels are out-of-phase, the bushes 413 are compressively deformed to allow the body 411 to rotate at a predetermined angle, and restrict the body 411 from rotating at more than a predetermined angle by using an elastic restoring force. Thus, the bushes 413 may prevent the interference with a neighboring part and the damage to the elastic part 420 to be described below, which are caused by an excessive rotation of the body 411.

The elastic part 420 is extended in the widthwise direction of the vehicle, and has one side connected to the knuckle part 300. The elastic part 420 is provided as a pair of elastic parts which are fixed to both sides of the support part 410, respectively. The elastic part 420 offsets a change in height of the knuckle part 300 with an elastic restoring force thereof. When the support part 410 is rotated, the elastic part 420 applies elastic restoring forces, acting in the opposite directions, to the pair of knuckle parts 300.

The elastic part 420 in accordance with the embodiment of the present disclosure includes a fastening part 421, a first elastic member 422, and a second elastic member 423.

The fastening part 421 is fixed to the support part 410, and supports the first and second elastic members 422 and 423 which will be described below. The fastening part 421 is provided as a pair of fastening parts which are disposed on both sides of the support part 410, respectively. The fastening part 421 in accordance with the embodiment of the present disclosure is fixed to a side surface of an end portion of the support part 410 through welding or the like. The fastening part 421 has a first seating part 421a and a second seating part 421b formed therein. The first and second seating parts 421a and 421b may each be formed in the shape of a groove recessed into the fastening part 421. The first and second seating parts 421a and 421b are recessed into the fastening part 421 such that open sides thereof face different directions. Thus, the fastening part 421 may be formed in substantially an S-shape.

The first elastic member 422 has one side seated on the first seating part 421a and the other side connected to the knuckle part 300. The first elastic member 422 in accordance with the embodiment of the present disclosure may be formed in the shape of a plate spring extended in a longitudinal direction thereof, corresponding to the widthwise direction of the vehicle. One end of the first elastic member 422 is inserted into the first seating part 421a, and fixed to the fastening part 421 by a bolt or the like. The other end of the first elastic member 422 is connected to the other side of the knuckle part 300 through a fixing member such as a bracket or the like. When the height of the knuckle part 300 is changed by a load or lateral acceleration applied from the road surface, the shape of the first elastic member 422 is changed to apply an elastic restoring force in a direction to offset a change in height of the knuckle part 300.

The second elastic member 423 has one side seated on the second seating part 421b and the other side facing the fixed part 430 which will be described below. The second elastic member 423 selectively comes into contact with the fixed part 430 according to the rotation direction of the support part 410. When the second elastic member 423 comes into contact with the fixed part 430, the shape of the second elastic member 423 is changed to apply an elastic restoring force to the body 411, the elastic restoring force acting in the opposite direction to the rotation direction of the body 411. The second elastic member 423 in accordance with the embodiment of the present disclosure may be formed in the shape of a plate spring extended in a longitudinal direction thereof, corresponding to the widthwise direction of the vehicle. The second elastic member 423 has one end inserted into the second seating part 421b and fixed to the fastening part 421 by a bolt or the like. The other end of the first elastic member 422 has a bottom surface facing the top surface of the fixed part 430.

The first and second elastic members 422 and 423 may each be made of GFRP (Glass Fiber Reinforced Plastic) to secure a sufficient elastic force and a small weight at the same time. The first and second elastic members 422 and 423 may be extended so as to be curved at a predetermined curvature to induce stress concentration in a predetermined section, when the height of the knuckle part 300 is changed. Therefore, when the height of the knuckle part 300 is changed, the first and second elastic members 422 and 423 may be deformed more than in the case that the first and second elastic members 422 and 423 are formed simply in a straight line shape, thereby generating a stronger elastic restoring force.

The fixed part 430 is fixed at a position facing the other side of the elastic part 420. The fixed part 430 is provided as a pair of fixed parts which are disposed so as to face the other sides of the pair of elastic parts 420, respectively. The fixed part 430 comes into contact with or separates from the other side of the elastic part 420, according to the rotation direction of the support part 410. The fixed part 420 in accordance with the embodiment of the present disclosure may be formed in the shape of a plate such that the top surface thereof horizontally faces the bottom surface of the other side of the second elastic member 423. When the support part 410 is rotated, the fixed part 430 abuts on the other side of the second elastic member 423 and functions as a fixed point to induce elastic deformation of the second elastic member 423. The fixed part 430 may be welded to the member part 100, or specifically the inner surface of the cross member part 120, such that the position thereof is fixed. However, the position of the fixed part 430 is not limited thereto, but may be varied in design such as the side member part 110 or a separate vehicle body structure.

Hereafter, an operation process of a suspension apparatus for a vehicle in accordance with an embodiment of the present disclosure will be described in detail.

Figure 6:
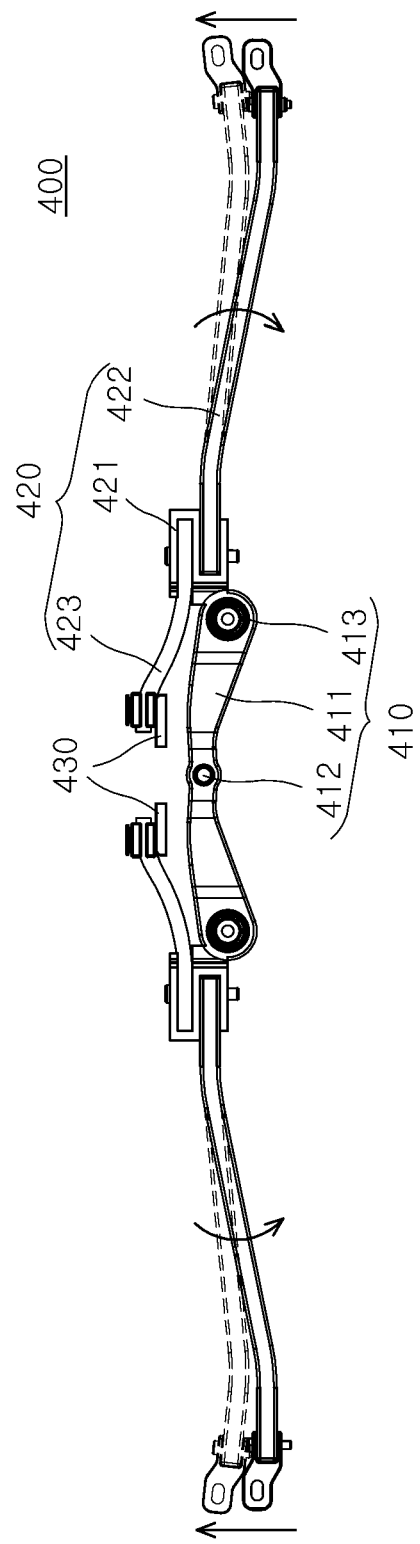
FIGS. 6 and 7 are operation diagrams schematically illustrating an operation state of the suspension apparatus for a vehicle in accordance with the embodiment of the present disclosure.
Figure 7:
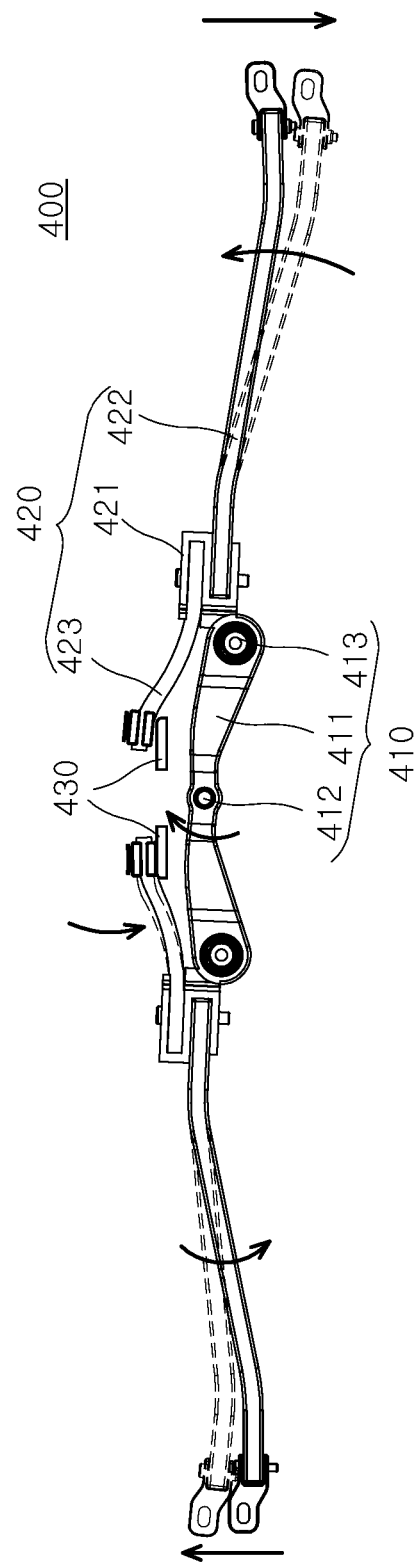

FIGS. 6 and 7 are operation diagrams schematically illustrating an operation state of the suspension apparatus for a vehicle in accordance with the embodiment of the present disclosure.

Referring to FIG. 6, when the vehicle is stopped or travels on a flat road, the pair of elastic parts 420 support the vehicle body with the same elastic restoring forces, thereby maintaining the horizontal state of the vehicle.

When the same load is applied to both wheels due to a predetermined profile of the road surface during driving of the vehicle, both the wheels are moved upward together while maintaining an in-phase state.

In connection with the movement of the wheels, the pair of knuckle parts 300 are also moved upward while maintaining the same height.

The first elastic member 422 is bent upward by the movement of the knuckle part 300, and presses the knuckle part 300 downward with an elastic restoring force proportional to the deformation. In this case, as the same load is applied to both wheels, the pair of first elastic members 422 press the pair of knuckle parts 300 with the same elastic restoring force.

As the knuckle parts 300 are pressed downward, the wheels maintain the contact with the ground surface.

As the pair of knuckle parts 300 also maintain the same height, no rotational force is generated in the support part 410.

As the support part 410 maintains the horizontal state, the relative movement of the second elastic member 423 with respect to the fixed part 430 does not occur, and the second elastic member 423 maintains a neutral state in which the second elastic member 423 applies no separate elastic restoring force to the support part 410.

Referring to FIG. 7, when both wheels become out-of-phase as the vehicle makes a turn or travels on an uneven road, the pair of knuckle parts 300 are moved in the opposite directions while the relative height therebetween increases.

For example, when a left wheel is moved upward and a right wheel is moved downward, the first elastic member 422 disposed on the left side is bent upward by the upward movement of the knuckle part 300, and presses the knuckle part 300 downward with an elastic restoring force proportional to the deformation.

As the left wheel is moved upward and the right wheel is moved downward, the body 411 is rotated at a predetermined angle in the clockwise direction around the joint 412.

As the body 411 is rotated in the clockwise direction, the second elastic member 423 disposed on the left side is brought into contact with the fixed part 430 and bent upward. Then, the second elastic member 423 applies an elastic force, facing in the counterclockwise direction, to the body 411 in proportion to the rotation angle of the body 411.

Simultaneously, the bush 413 restricts the body 411 from rotating at a predetermined angle or more, and applies an elastic restoring force, facing the counterclockwise direction, to the body 411 in proportion to the compressive deformation by the rotation of the body 411.

The first elastic member 422 disposed on the right side is bent downward by the downward movement of the knuckle part 300, and pulls the knuckle part 300 upward with the elastic restoring force proportional to the deformation.

The second elastic member 423 disposed on the right side is separated from the fixed part 430 according to the rotation of the body 411 in the clockwise direction, and maintains a neutral state in which the second elastic member 423 applies no separate elastic restoring force.

That is, the left wheel is restricted from moving upward by the downward elastic restoring force applied by the first elastic member 422 and the counterclockwise elastic restoring force applied by the second elastic member 423, and the right wheel is restricted from moving downward by the upward elastic restoring force applied by the first elastic member 422. Thus, both wheels may stably maintain the contact with the road surface even when the wheels become out-of-phase due to lateral acceleration or the like.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension apparatus for a vehicle, comprising:
   a member part comprising a side member part extended in a first direction and a cross member part extended in a second direction;
   a pair of knuckle parts spaced apart from each other in the second direction, and coupled to and supported by a wheel; and
   a posture maintenance part supported by the member part, having both sides connected to the pair of knuckle parts, respectively, and configured to absorb shock and adjust a relative height between the pair of knuckle parts,
   wherein the posture maintenance part comprises:
      a support part rotatably coupled to the member part;
      a pair of elastic parts fixed to both sides of the support part, each elastic part having one side connected to the corresponding knuckle part, and configured to offset a change in height of the knuckle part with an elastic restoring force thereof; and
      a fixed part fixed at a position facing the other side of the elastic part, and configured to come into contact with or separate from the other side of the elastic part according to a rotation direction of the support part.

2. The suspension apparatus of claim 1, wherein the support part comprises:
   a body facing the member part;
   a joint disposed in a center of the body, and configured to rotatably support the body with respect to the member part; and
   a bush disposed on either side of the body, and connected to the member part so as to restrict a rotation angle of the body.

3. The suspension apparatus of claim 2, wherein the joint has a one side connected to a surface of the body, and the other side rotatably connected to an inner surface of the cross member part.

4. The suspension apparatus of claim 2, wherein the bush is made of an elastic material.

5. The suspension apparatus of claim 2, wherein the pair of elastic parts apply elastic restoring forces, acting in the opposite directions, to the pair of knuckle parts, when the support part is rotated.

6. The suspension apparatus of claim 5, wherein the elastic part comprises:
   a fastening part fixed to the support part, and having a first seating part and a second seating part;
   a first elastic member having one side seated on the first seating part and the other side connected to the knuckle part; and
   a second elastic member having one side seated on the second seating part and the other side selectively contacted with the fixed part.

7. The suspension apparatus of claim 6, wherein the first seating part and the second seating part are provided with a groove recessed into the fastening part.

8. The suspension apparatus of claim 7, wherein the first seating part and the second seating part are recessed into the fastening part such that open sides thereof face different directions.

9. The suspension apparatus of claim 6, wherein an end of the first elastic member is disposed in the first seating part, and fixed to the fastening part by a bolt.

10. The suspension apparatus of claim 6, wherein an end of the second elastic member is disposed in the second seating part, and fixed to the fastening part by a bolt.

11. The suspension apparatus of claim 6, wherein the first elastic member and the second elastic member are made of GFRP (Glass Fiber Reinforced Plastic).

12. The suspension apparatus of claim 6, wherein the first elastic member and the second elastic member are extended so as to be curved at a predetermined curvature.

13. The suspension apparatus of claim 2, wherein the fixed part is fixed to the member part.

14. The suspension apparatus of claim 1, wherein the first direction is a longitudinal direction of the vehicle, and the second direction is a widthwise direction of the vehicle.

* * * * *